US008191835B2

(12) United States Patent
Grohmann et al.

(10) Patent No.: US 8,191,835 B2
(45) Date of Patent: Jun. 5, 2012

(54) WING OF AN AIRCRAFT

(75) Inventors: Boris Grohmann, Taufkirchen (DE); Johann Reichenberger, Ainring (DE); Thomas Lorkowski, Taufkirchen (DE)

(73) Assignee: Airbus Deutschland GmbH, Hamburg (DE)

( * ) Notice: Subject to any disclaimer, the term of this patent is extended or adjusted under 35 U.S.C. 154(b) by 332 days.

(21) Appl. No.: 12/448,142

(22) PCT Filed: Dec. 11, 2007

(86) PCT No.: PCT/EP2007/010831

§ 371 (c)(1), (2), (4) Date: Jun. 10, 2009

(87) PCT Pub. No.: WO2008/071399

PCT Pub. Date: Jun. 19, 2008

(65) Prior Publication Data

US 2010/0019095 A1 Jan. 28, 2010

(30) Foreign Application Priority Data

Dec. 11, 2006 (DE) ........................ 10 2006 058 650

(51) Int. Cl.
*B64C 3/50* (2006.01)

(52) U.S. Cl. ......... 244/214; 244/130; 244/204; 244/215

(58) Field of Classification Search .................. 244/130, 244/198, 201, 203, 204, 212–217
See application file for complete search history.

(56) References Cited

U.S. PATENT DOCUMENTS

| | | | | |
|---|---|---|---|---|
| 3,129,907 | A * | 4/1964 | Dornier et al. | 244/216 |
| 6,457,680 | B1 | 10/2002 | Dobrzynski et al. | |
| 2008/0251647 | A1 | 10/2008 | Lorkowski et al. | |

FOREIGN PATENT DOCUMENTS

| | | |
|---|---|---|
| DE | 14 81 578 | 1/1970 |
| DE | 199 25 560 | 12/2000 |
| DE | 10 2004 056 537 | 6/2006 |
| GB | 2 003 098 | 3/1979 |
| GB | 2 096 551 | 10/1982 |

OTHER PUBLICATIONS

International Search Report (Apr. 17, 2008).
Chinese Office Action dated Aug. 4, 2010 with English translation of same.

* cited by examiner

*Primary Examiner* — Timothy D Collins
*Assistant Examiner* — Jamie S Stehle
(74) *Attorney, Agent, or Firm* — Collard & Roe, P.C.

(57) ABSTRACT

A wing of an aircraft has a mainplane, which has an upper face, a lower face and an aerodynamically shaped area. The wing has an additional airfoil which is articulated on the mainplane and can be extended from a retracted state with a slot area being opened between the mainplane and the additional airfoil. The wing also has a variable-position slot-varying apparatus which is arranged on the lower face, forms a part of the aerodynamic profile of the additional airfoil or mainplane when the additional airfoil is extended, and at least partially covers the slot area between the mainplane and the additional airfoil on the lower face when the additional airfoil is in the retracted state. The slot-varying apparatus can be varied between a curved configuration, in which it forms a part of an aerodynamic profile, and an extended configuration, in which it at least partially covers the slot area.

16 Claims, 10 Drawing Sheets

WING OF AN AIRCRAFT

CROSS REFERENCE TO RELATED APPLICATIONS

This application is the National Stage of PCT/EP2007/010831 filed on Dec. 11, 2007, which claims priority under 35 U.S.C. §119 of German Application No. 10 2006 058 650.6 filed on Dec. 11, 2006. The international application under PCT article 21(2) was published in English.

BACKGROUND OF THE INVENTION

1. Field of the Invention

The invention relates to a wing for an aircraft.

2. The Prior Art

DE 14 81 578 A1 discloses a wing for an aircraft, having a mainplane which has an upper face, a lower face and an aerodynamically shaped nose area, and having an additional airfoil, which is articulated on the mainplane, and has an aerodynamically shaped nose area, which is located at the front in the flow direction and an aerodynamically shaped rear-face area, which faces the nose area of the mainplane. The additional airfoil can be extended from a retracted state opening a slot (which guides air from the lower face of the slat to the upper face of the mainplane) between the nose area of the mainplane and the rear-face area of the additional airfoil, in order to increase the lift. A variable-position sealing element is arranged on the lower face of the additional airfoil and, when the additional airfoil is retracted, forms a part of its aerodynamic profile and, when the additional airfoil is in the retracted state, covers the slot between the mainplane and the additional airfoil on the lower face. The sealing element is provided in the form of a rigid flap which forms a major part of the aerodynamically shaped nose area and a part of the rear-face area of the additional airfoil and can be pivoted somewhat about the center point of an imaginary profile nose circle towards the mainplane and, when the slat is retracted, covers the remaining slot which is located between the slat and the mainplane and represents an interruption in the profile contour. A wing such as this is presupposed to be known.

Furthermore, DE 10 2004 056 537 A1 discloses a wing for an aircraft having a mainplane and an additional airfoil which is articulated on the mainplane. In order to reduce aerodynamic noise which is created by vortex formation on the rear face of the additional airfoil when the additional airfoil is extended, separating surfaces are provided which can be moved into the slot area between the additional airfoil and the mainplane when the additional airfoil is extended. In one of the exemplary embodiments described there, the separating surface is formed by a variable-position flap at the lower end of the nose area of the additional airfoil, which is folded on to the rear-face area when the slat is retracted and, when the slat is extended, is folded into the slot between the slat and the mainplane, lengthening the aerodynamic profile of the lower face of the additional airfoil.

A similar wing for an aircraft having a mainplane and an additional airfoil which is articulated on the mainplane in which, in order to reduce aerodynamic noise which is created by vortex formation on the rear face of the additional airfoil when the additional airfoil is extended, has a variable-position flap at the lower end of the nose area of the additional airfoil, which is folded on to the rear-face area when the slat is retracted and, when the slat is extended, is folded into the slot between the slat and the mainplane, lengthening the aerodynamic profile of the lower face of the additional airfoil, is also known from DE 199 25 560 B4.

SUMMARY OF THE INVENTION

The object of the invention is to provide an improved wing for an aircraft having a mainplane, an additional airfoil and a variable-position sealing element in order in particular to significantly reduce the noise that occurs during the landing approach.

According to the invention, the object is achieved by a wing as described herein. Advantageous embodiments and developments of the wing according to the invention are also specified herein.

The invention provides a wing for an aircraft, having a mainplane, which has an upper face, a lower face and an aerodynamically shaped nose area, and an additional airfoil, which is articulated on the mainplane and has an aerodynamically shaped nose area facing the flow and an aerodynamically shaped rear-face area facing the nose area of the mainplane, and can be extended from a retracted state with a slot area between the nose area of the mainplane and the rear-face area of the additional airfoil being opened, and having a variable-position sealing element, which is arranged on the lower face of the additional airfoil, forms a part of its aerodynamic profile when the additional airfoil is extended, and at least partially covers the slot area between the mainplane and the additional airfoil on the lower face when the additional airfoil is in the retracted state. The invention provides that the sealing element is arranged, formed separately from the nose area of the additional airfoil, at the transition between the nose area and the rear-face area of the additional airfoil and can be varied between a curved configuration, in which it forms a part of the aerodynamic profile of the additional airfoil with a curved transition from the nose area to the rear-face area of the additional airfoil when the additional airfoil is extended, and an extended configuration, in which when the additional airfoil is in the retracted state, it at least partially covers the slot area between the mainplane and the additional airfoil on the lower face.

One advantage of the embodiment of the wing according to the invention is that not only does it have an optimum profile in the sense of maximizing the increase in lift in the extended state of the additional airfoil but also has an optimum profile shape in the sense of good flying characteristics and performance when the additional airfoil is in the retracted state.

A further advantage of the wing according to the invention is that the noise which otherwise occurs, in particular during a landing approach, when the additional airfoil is extended owing to the rear face of additional airfoils (also referred to as "slat hooks"), that have been used until now, having a cambered taper, is considered reduced by the curved sealing element. The curved sealing element results in the rear face of the additional airfoil having a continuous shape, without any sudden changes in the extended state, thus significantly reducing vortex formation in the slot area, and therefore the noise that is generated. At the same time, when the additional airfoil is retracted, that is to say in particular during cruise flight, the bridging of the slot between the mainplane and the additional airfoil results in a smooth profile lower-face contour, thus ensuring optimum aerodynamic quality.

One embodiment of the wing according to the invention provides that the sealing element is designed to be elastically flexible at least in places in the profile chord direction of the wing, such that its shape can be adapted. This advantageously ensures reliable extension and retraction of the additional airfoil even in the event of a malfunction of the sealing element.

According to one embodiment of the wing according to the invention, the sealing element has flexibly variable curvature so that, when the additional airfoil is extended, it forms a part of its aerodynamic profile in a curved configuration and, when the additional airfoil is in the retracted state, in an extended configuration it at least partially covers the slot area between the mainplane and the additional airfoil on the lower face. Calculations show that a continuous rear face of the additional airfoil, without any sudden changes, and formed by the curved sealing element, reduces vortex formation and makes it possible to achieve a considerable reduction in noise.

According to one embodiment, the front end of the sealing element in the profile chord direction is fixed to the additional airfoil.

According to another embodiment of the wing according to the invention, the front end of the sealing element in the profile chord direction is mounted with respect to the additional airfoil, such that it can rotate about the span direction or transversely with respect to the flow direction, and has a curved part which forms the curved transition from the nose area of the rear-face area of the additional airfoil when the additional airfoil is extended, and, at its rear end in the profile chord direction has an extended part which covers the slot area between the mainplane and the additional airfoil on the lower face when the additional airfoil is in the retracted state.

According to one embodiment of the wing according to the invention, the sealing element can be varied between the curved configuration, in which it forms a part of the aerodynamic profile of the additional airfoil with the curved transition from the nose area to the rear-face area of the additional airfoil, when the additional airfoil is extended and the extended configuration, in which it at least partially covers the slot area between the mainplane and the additional airfoil on the lower face when the additional airfoil is in the retracted state by aerodynamic forces acting between the mainplane and the additional airfoil.

According to another embodiment of the wing according to the invention, the sealing element can be varied by a drive device, which is coupled to the sealing element between the curved configuration, in which it forms a part of the aerodynamic profile of the additional airfoil with the curved transition from the nose area to the rear-face area of the additional airfoil when the additional airfoil is extended, and the extended configuration in which it at least partially covers the slot area between the mainplane and the additional airfoil on the lower face when the additional airfoil is in the retracted state.

In this case, the drive device may be arranged in the sealing element.

The drive device may be arranged in the curved part of the sealing element which forms the curved transition from the nose area to the rear-face area of the additional airfoil.

According to one embodiment of the wing according to the invention, the drive device is kinematically coupled to the movement of the additional airfoil with respect to the mainplane in the sense of positive movement of the sealing element during extension and retraction of the additional airfoil.

In this case the invention provides in particular for the drive device to be kinematically coupled to a rail by means of which the additional airfoil is articulated on the mainplane.

According to a further embodiment of the present invention, a wing is provided for an aircraft, comprising a mainplane, which has an upper face, a lower face and an aerodynamically shaped rear-face area, an additional airfoil, which is arranged on the rear face of the mainplane and is articulated on the mainplane, an aerodynamically shaped nose area facing the rear-face area of the mainplane, and which can be moved between a retracted and extended state opening a slot area between the rear-face area of the mainplane and the nose area of the additional airfoil. According to the invention, a variable-position sealing element which is arranged on the rear face of the mainplane and, when the additional airfoil is extended, it forms a part of the aerodynamic profile of the mainplane and, when the additional airfoil is in the retracted state, at least partially covers the slot area between the mainplane and the additional airfoil on the lower face, with the sealing element being arranged at the transition between the lower face and the rear-face area of the mainplane and can be varied between a curved configuration, in which it forms a part of the aerodynamic profile of the mainplane at the curved transition from the lower face to the rear-face area of the mainplane when the additional airfoil is extended, and an extended configuration in which it at least partially covers the slot area between the mainplane and the additional airfoil on the lower face when the additional airfoil is in the retracted state.

One advantage of the design of the wing according to the invention as used in this embodiment is that, in addition, it not only has an optimum profile in the sense of maximizing the increase in lift when the additional airfoil is in the retracted state, but also has an optimum profile shape in the sense of good flying characteristics and performance when the additional airfoil is in the retracted state.

A further advantage of this wing according to the invention is also that the noise which otherwise occurs when the additional airfoil is extended, in particular during the landing approach, is considerably reduced by the curved sealing element. The curved sealing element provides the rear face of the mainplane with a continuous shape, without any sudden changes, in the extended state, considerably reducing vortex formation in the slot area, and therefore the noise that is generated. At the same time, when the additional airfoil is retracted, that is to say in particular during cruise flight, the bridging of the slot between the mainplane and the additional airfoil results in a smoother profile lower face contour, thus ensuring optimum aerodynamic quality.

According to one embodiment of the wing according to the invention, provision is made for the sealing element to be designed to be elastically flexible at least in places in the profile chord direction of the wing, and for its shape therefore to be adaptable. This advantageously ensures reliable extension and retraction of the additional airfoil, even in the event of a malfunction of the sealing element.

According to one embodiment of the wing according to the invention, the sealing element has flexibly variable curvature so that, when the additional airfoil is extended in a curved configuration it forms part of its aerodynamic profile and, when the additional airfoil is in the retracted state, in an extended configuration, it at least partially covers the slot area between the mainplane and the additional airfoil on the lower face. In this case, as well, calculations show that a continuous rear face of the mainplane, without any sudden changes, formed by the curved sealing element, reduces vortex formation allowing a considerable reduction in noise to be achieved.

According to one embodiment, the front end of the sealing element in the profile chord direction is fixed to the mainplane.

According to one embodiment of the mainplane according to the invention, the front end of the sealing element in its profile chord direction is mounted with respect to the mainplane such that it can rotate about the span direction and a curved part, which forms the curved transition from the lower face to the rear-face area of the mainplane when the additional airfoil is extended and, at its rear end in the profile chord direction, has an extended part which covers the slot area between the mainplane and the additional airfoil on the lower face when the additional airfoil is in the retracted state.

According to one embodiment, the sealing element can be varied between the curved configuration and the extended configuration by aerodynamic forces acting between the mainplane and the additional airfoil.

According to another embodiment, the sealing element can be varied between the curved configuration and the extended configuration by means of a drive device which is coupled to the sealing element.

According to one embodiment, the drive device is arranged in the sealing element.

According to one embodiment the drive device is arranged in the curved part of the sealing element which forms the curved transition from the lower face to the rear-face area of the mainplane.

According to one embodiment of the wing according to the invention, the drive device is kinematically coupled to the movement of the additional airfoil with respect to the mainplane in the sense of positive movement of the sealing element during extension and retraction of the additional airfoil.

In this case, the drive device can be kinematically coupled to a rail, by means of which the additional airfoil is articulated on the mainplane.

BRIEF DESCRIPTION OF THE DRAWINGS

Exemplary embodiments of the invention will be explained in the following text with reference to the drawing.

In the figures:

FIG. 1*a* shows the additional airfoil solely in its extended position, and FIG. 1*b* shows the mainplane with the additional airfoil in its retracted position;

FIG. 2*a* shows the additional airfoil solely in its extended position, and FIG. 2*b* shows the mainplane with the additional airfoil in its retracted position;

FIG. 3 shows a schematic cross-sectional view of a wing of an aircraft with a mainplane and an additional airfoil which is articulated on the mainplane, according to a second variant of the first exemplary embodiment of the invention; in which FIG. 3*a* shows the additional airfoil solely in its extended position, and FIG. 3*b* shows the mainplane with the additional airfoil in its retracted position;

FIG. 5 shows a schematic cross-sectional view of a wing of an aircraft with a mainplane and an additional airfoil which is articulated on the mainplane, according to the second variant of the second exemplary embodiment of the invention with different profile shapes of the additional airfoil; in which FIGS. 5*a*, 5*b*, 5*c* show various variants of the additional airfoil solely in its extended position, and FIG. 5*d* shows the mainplane with the additional airfoil in its retracted position;

Figure 6:
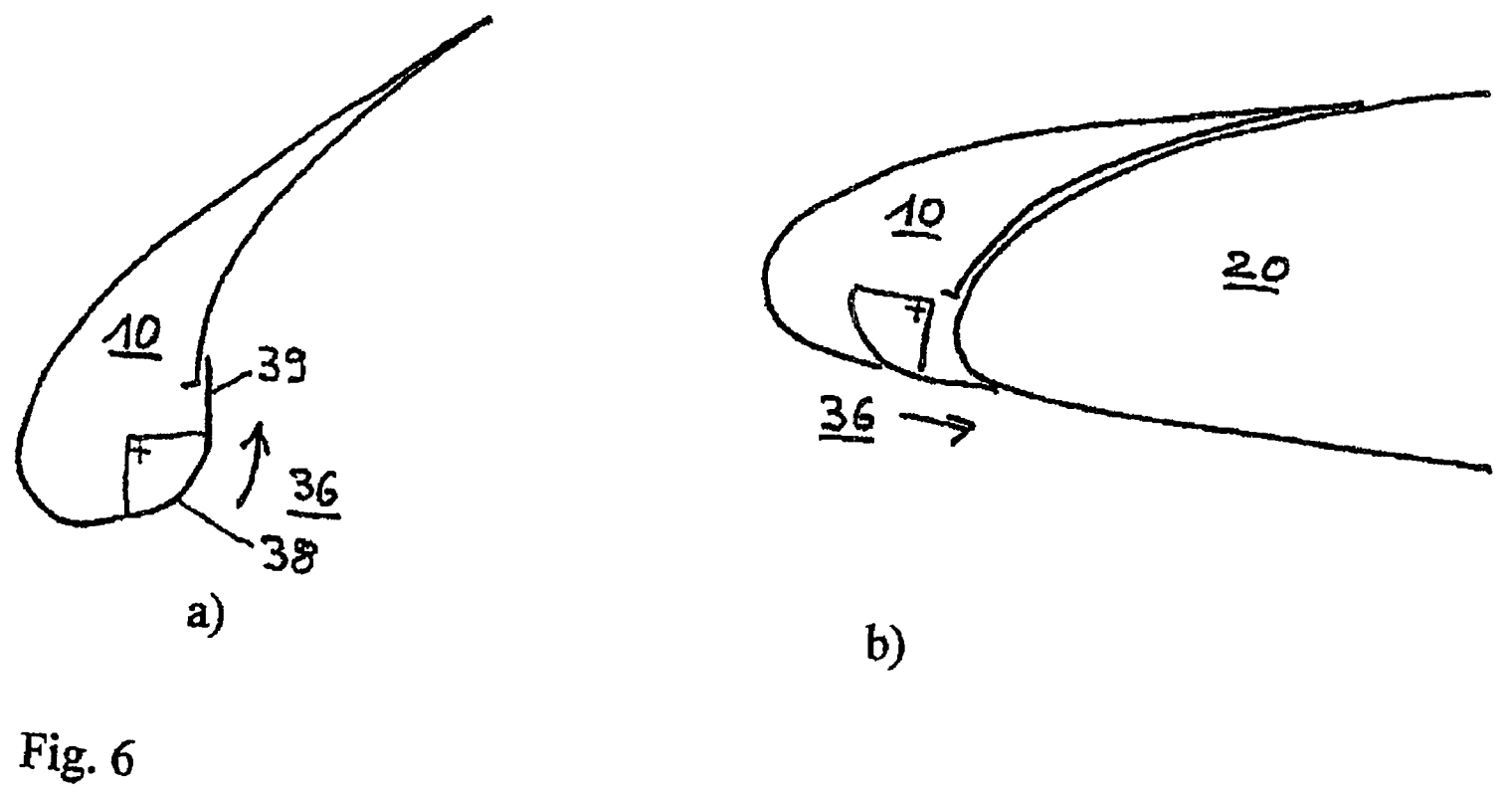

FIG. 6 shows a schematic cross-sectional view of a wing of an aircraft with a mainplane and an additional airfoil which is articulated on the mainplane according to a third exemplary embodiment of the invention; in which FIG. 6*a* shows the additional airfoil solely in its extended position, and FIG. 6*b* shows the mainplane with the additional airfoil in its retracted position;

FIG. 9 shows a schematic cross-sectional view of a wing of an aircraft with a mainplane and an additional airfoil which is articulated on the mainplane, according to a further exemplary embodiment of the invention; in which FIG. 9*a* shows the mainplane with the additional airfoil in its extended position, and FIG. 9*b* shows the mainplane with the additional airfoil in its retracted position;

DETAILED DESCRIPTION OF THE PREFERRED EMBODIMENTS

Figure 1:
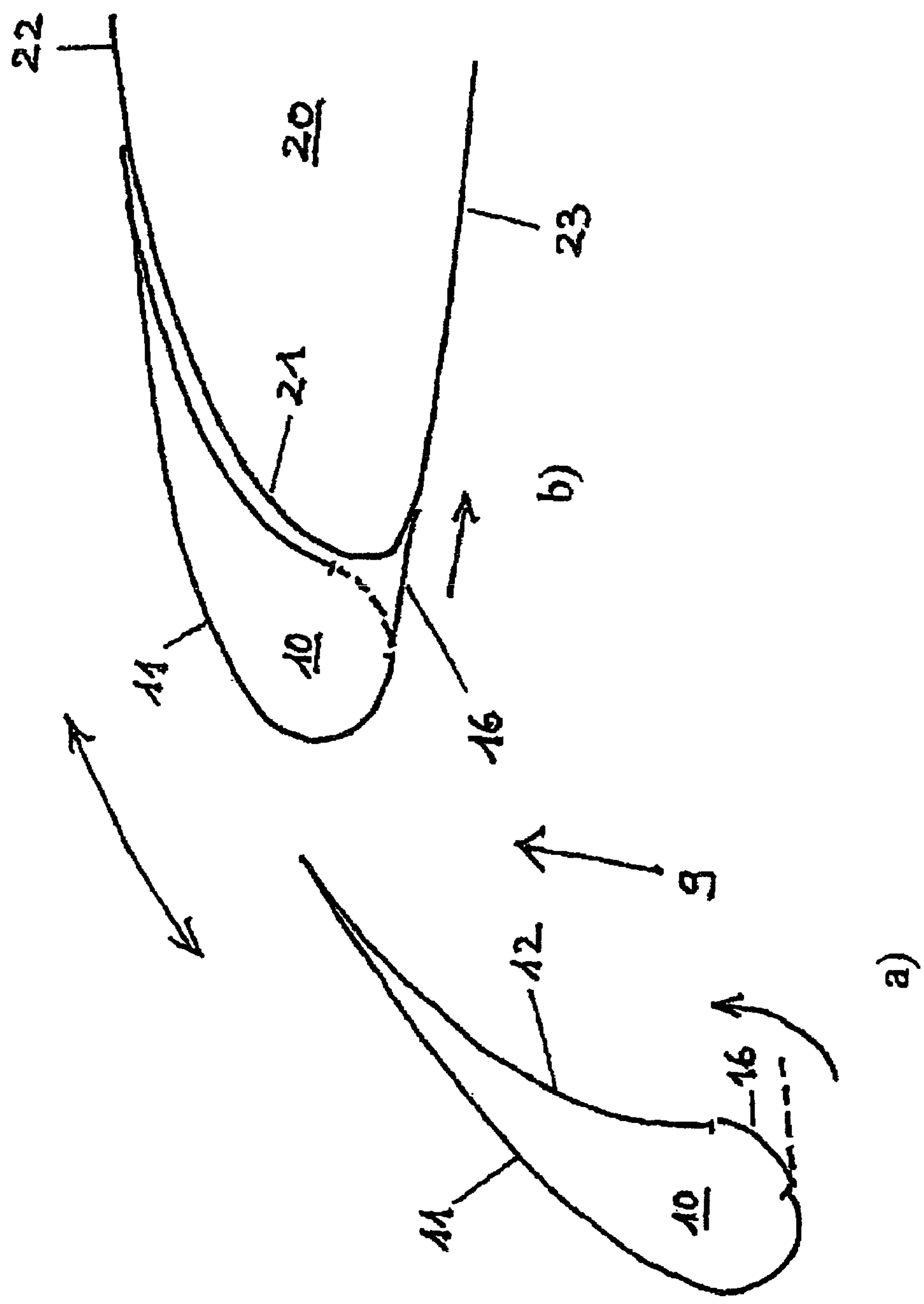
FIG. 1 shows a schematic cross-sectional view of a wing of an aircraft having a mainplane and an additional airfoil which is articulated on the mainplane according to a first exemplary embodiment of the invention; in this case

FIGS. 1 to 8 show various exemplary embodiments of a wing of an aircraft with a mainplane 20, which has an upper face and an upper profile surface area 22 (suction side) and a lower face or a lower profile surface area 23 (pressure side) and an aerodynamically shaped nose area 21. A slat or additional airfoil 10 is articulated on the mainplane 20 and has an aerodynamically shaped nose area 11, located at the front in the flow direction and an aerodynamically shaped rear face area 12, facing the nose area 21 of the mainplane 20. The additional airfoil 10 can be extended from a retracted position, opening a slot or slot area 9, which guides air from the lower face of the slat to the upper face of the mainplane in order to increase lift, between the nose area 21 of the mainplane 20 and the rear face area 12 of the additional airfoil 10 and/or can be moved between a retracted state and one or more extended states.

A sealing element 16; 26; 36; 46 which can move or whose position and/or shape are/is variable, or a deformable slot-varying or sealing apparatus or a sealing apparatus which can itself be deformed between two extreme position states is arranged on the lower face of the additional airfoil 10. When the additional airfoil 10 is extended, the sealing apparatus forms a part of its aerodynamic profile, that is to say of its aerodynamic profile surface, or rests at least in places on the profile surface of the additional airfoil and, when the additional airfoil 10 is in the retracted state, partially or entirely covers the slot 9, which remains when the additional airfoil 10 is retracted, between the mainplane 20 and the additional airfoil 10 on the lower face 23 of the mainplane 20 or the lower face 23*a* of the additional airfoil 10. The sealing element or the slot-varying apparatus 16; 26; 36; 46 is arranged at the transition in the assumed direction of incident flow S between the surface area facing the flow or the nose area 11, and the surface area facing away from the flow, or the rear-face area 12, of the additional airfoil 10. The sealing element 16; 26; 36; 46 can be varied and moved between a configuration in which it rests at least in places on the additional airfoil 10, that is to say a retracted or curved configuration in which, when the additional airfoil 10 is extended it forms a part of its aerodynamic profile with a curved transition from the nose area 11 to the rear face area 12 of the additional airfoil 10, and an extended configuration or slot-influencing configuration, in which it covers the slot area 9 between the mainplane 20 and the additional airfoil 10 on the lower face when the additional airfoil is in the retracted state. Depending on the embodiment of the sealing apparatus 16; 26; 36; 46 and in particular its movement or deformation capabilities, the sealing apparatus 16; 26; 36; 46 can entirely or only partially close the slot 9 between the mainplane 20 and the additional airfoil 10 on the lower face of the mainplane 20 when the additional airfoil 10 is retracted to a greater or lesser extent. The slot-influencing state may, in particular be a slot-closing state in which the slot-varying apparatus closes the slot 9.

The slot-varying apparatus 16; 26; 36; 46 is fixed at its end 16*a* facing the lower faces 23, 23*a*, seen in the longitudinal direction L, on the additional airfoil 10, such that a second end 16*b* located at the opposite end to the first end 16*a*, moves relative to the additional airfoil 10 during variation of the movement state of the slot-varying apparatus 16; 26; 36; 46. Depending on the configuration of the slot-varying apparatus 16; 26; 36; 46, in particular in its length seen in the longitudinal direction L and/or possible extension movement states, and depending on the size of the slot 9 between the lower faces 23, 23*a* when the additional airfoil 10 is in the retracted state, the sealing apparatus or slot-varying apparatus 16; 26; 36; 46 covers the slot 9 entirely (FIG. 1*a*) or only partially (not illustrated). In one preferred embodiment, when the slot-varying apparatus 16; 26; 36; 46 is in the extended position, the second end 16*b* which is at the opposite end to the first end 16*a* of the slot-varying apparatus rests at a point on the mainplane surface on the transitional area between the upper face 22 and the lower face 23, at which the longitudinal direction L at the second end 16*b* and the profile of the mainplane contour, resting on it at the contact point A, or the tangent to this at the contact point A, form an acute angle with respect to one another.

In the slot-influencing configuration the slot-varying apparatus 16; 26; 36; 46 assumes a movement or deformation state in which the longitudinal axis of its cross section, which lies on the plane covered by the wing thickness direction and the incident-flow direction or the wing depth direction, departs at this point from the surface contour of the additional airfoil 10, starting from the first end 16*a*, and faces the mainplane 20. In this case the longitudinal axis of the slot-varying apparatus may, in particular, have a curved profile. In this state, the slot-varying apparatus 16; 26; 36; 46 can follow the contour profile of the additional airfoil 10 between the nose area and rear-face area thereof, on the lower face 23*a* of the additional airfoil, at least in places, and preferably in its profile of the longitudinal direction L. It is also possible for the slot-varying apparatus 16; 26; 36; 46 to project by a predetermined amount from the contour of the additional airfoil on the rear-face area in its retracted state, provided that this does not result in significant aerodynamic disadvantages. It is also possible to for the slot-varying apparatus 16; 26; 36; 46 to rest entirely or partially on the additional airfoil in its retracted state. In its extended state, the second end 16*b* of the slot-varying apparatus may rest on the contour of the lower face 23 or on the contour of the transitional area between the lower face 23 or the upper face 22 of the mainplane 20.

The slot-varying apparatus 16; 26; 36; 46 may be designed to be elastically flexible at least in places seen in its longitudinal direction or in the profile chord direction (see FIG. 7*a*), in order not to impede retraction of the additional airfoil 10 in the event of a failure or emergency, and to prevent damage to the nose area 21 of the mainplane 20 during retraction of the additional airfoil 10. For this purpose, the sealing element is formed from a soft material, for example, from glass-fiber-reinforced silicone. Furthermore, a slot-varying apparatus 16; 26; 36; 46 such as this ensures adequate flexibility in order to ensure the desired matching of the shape of the sealing element to the profile or to the profile contour of the additional airfoil 10.

Figure 2:
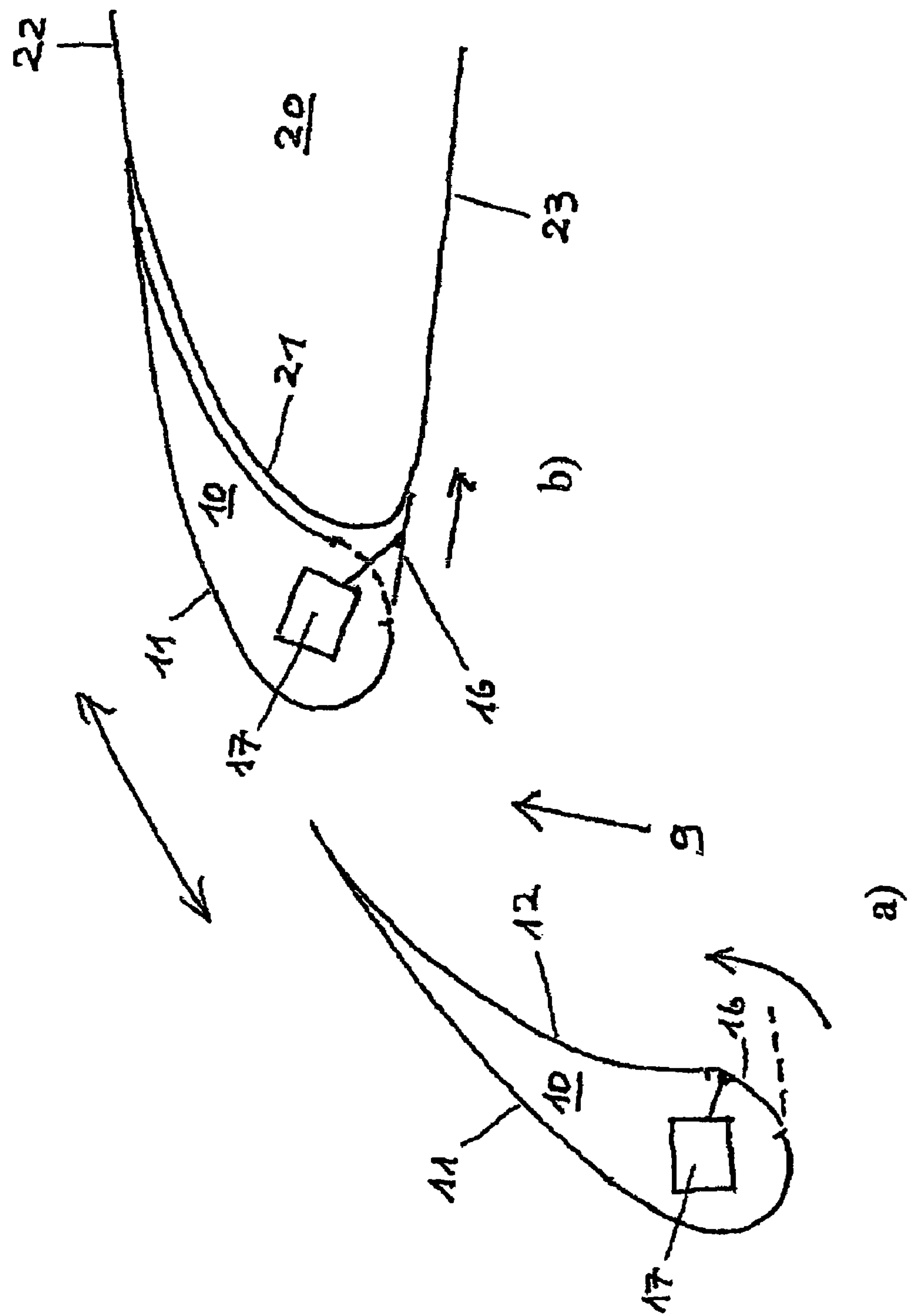
FIG. 2 shows a schematic cross-sectional view of the wing of an aircraft with a mainplane and an additional airfoil which is articulated on the mainplane, according to a first variant of the first exemplary embodiment of the invention; in this case.
Figure 3:
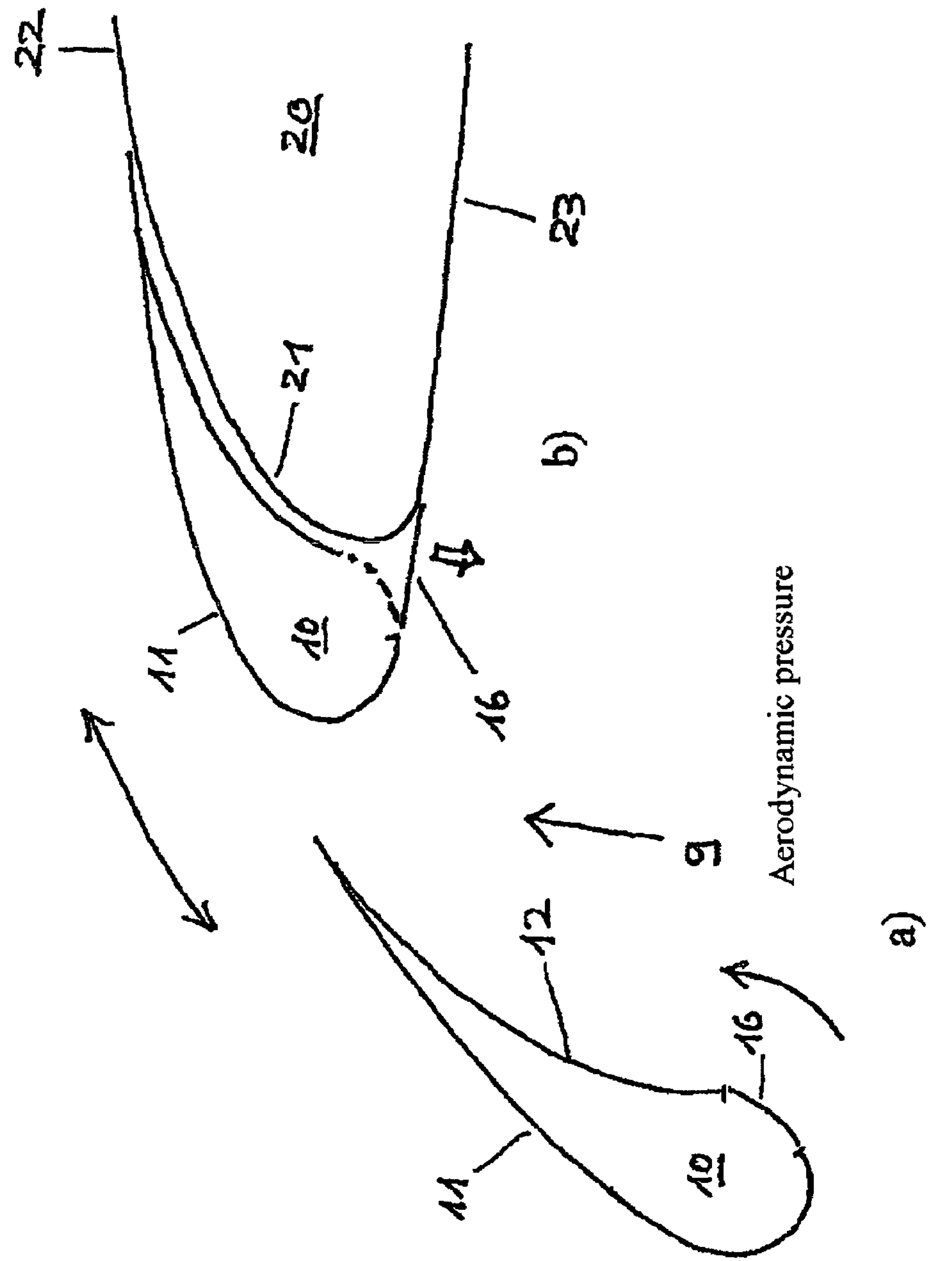
Figure 4:
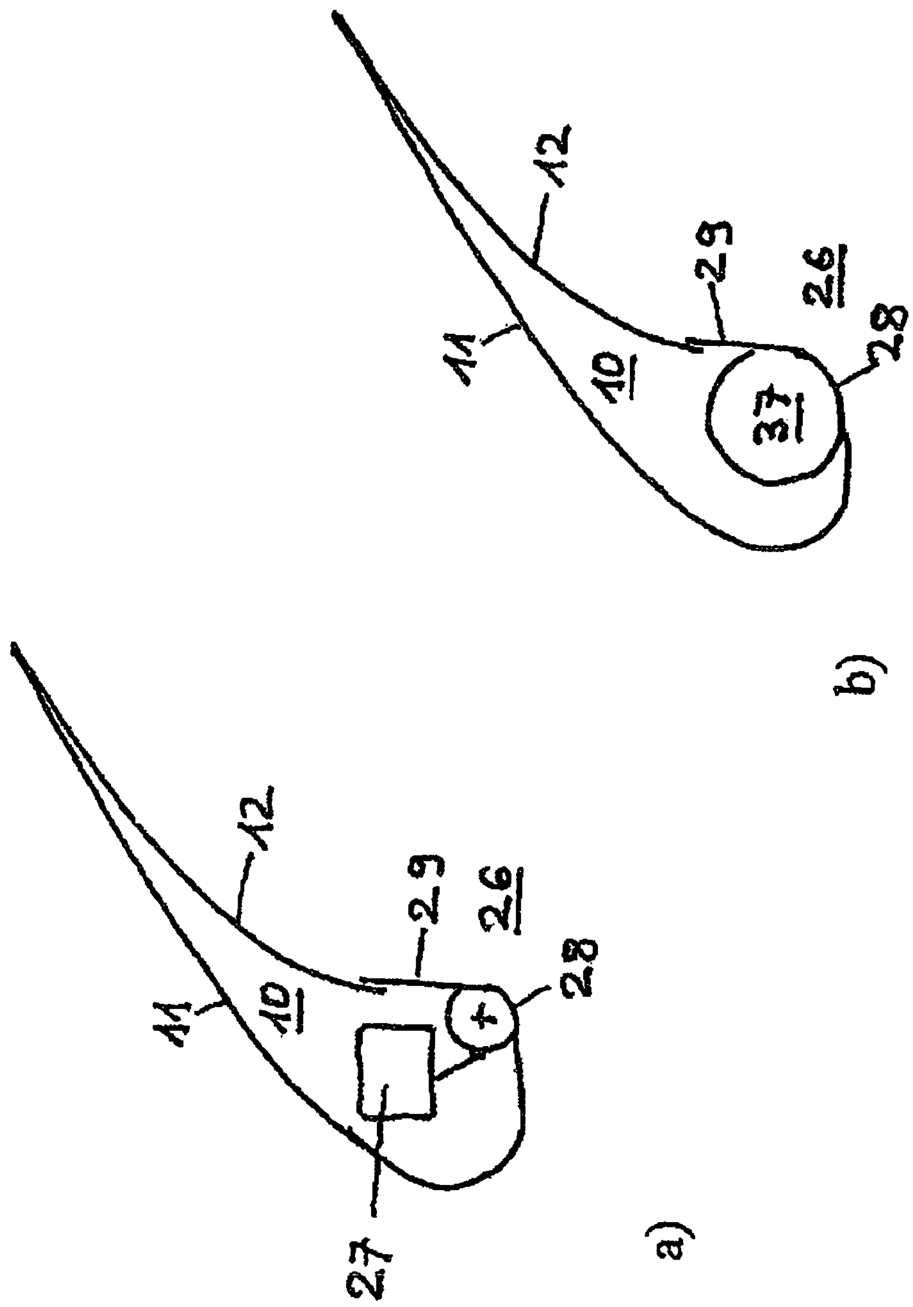
FIGS. 4*a* and 4*b* show schematic cross-sectional views of two variants of a further embodiment of the additional airfoil.

In the first exemplary embodiment of the invention, various variants of which are illustrated in FIGS. 1 to 3, the slot-varying apparatus 16; 26; 36; 46 or the sealing element 16 may be flexible or may have a variable or movable camber such that, when the additional airfoil 10 was extended, in a touching or retracted state which is shown in FIGS. 1*a*, 2*a* and 3*a*, a part of the aerodynamic profile of the additional airfoil 10, the sealing element 16 from the aerodynamic point of view forms a part of the aerodynamic profile of the additional airfoil 10 with a curved transition, without any discontinuity, from the nose area 11 to the rear-face area 12 of the additional airfoil 10. This state may be provided in particular such that the tangent to the trailing edge 16*b* runs above the stagnation point of the mainplane 20 when the additional airfoil 10 is in this position. If the transition not only has no sudden changes, that is to say it has a continuous gradient, but furthermore also has continuous curvature, this is particularly useful in order to prevent separation of the boundary layer. Furthermore, the slot-varying apparatus 16; 26; 36; 46 is designed such that, when the additional airfoil 10 is in the retracted state, this slot-varying apparatus 16; 26; 36; 46 entirely or at least partially covers the slot 9, which remains when the additional airfoil 10 is retracted, between the mainplane 20 and the additional airfoil 10 on the lower face or pressure side of the wing in its extended state, as is shown in FIGS. 1*b*, 2*b* and 3*b*, and thus influences the flow in the slot or prevents flow through the slot from the lower face 23, 23*a*. In these exemplary embodiments, the front end of the slot-varying apparatus 16 in its profile chord direction is attached or fixed to or articulated on the additional airfoil 10.

In the exemplary embodiments shown in FIGS. 4 to 8, the slot-varying apparatus 26; 36; 46 has an actuating part 28 which is mounted such that it can rotate about a rotation axis 28*a*, and a slat part 29; 39; 49 which is fitted to its rear end 28*b* seen in the flow direction S or in the profile chord direction P such that, during rotation of the actuating part, the slat part is folded in or out as appropriate. The rotation axis 28*a* need not be located within the rotating part but may be located outside it depending on the kinematic application. As illustrated in FIGS. 5*a* to 5*d*, a section of the external contour of the rotating part may in this case form a part of the surface contour of the additional airfoil 10. In this embodiment, the slat part is in the form of a rigid slat part. Alternatively, the slat part may also be in the form of a flexible slat part, or a variable-shape slat part.

The slot-varying apparatus 26; 36; 46 rests on the contour of the additional airfoil 10 in its retracted state (FIGS. 5*d*, 6*b*, 8*e*) and, in its extended state, extends away from the contour of the additional airfoil 10 such that the slot-varying apparatus 26; 36; 46 can at least partially cover the slot 9 beyond a predetermined position of the additional airfoil 10 at which it approaches the additional airfoil 10. In the case of the coupling which is preferably provided between the movement position of the additional airfoil 10 and the rotation position of the slot-varying apparatus 26; 36; 46, the slot-varying apparatus 26; 36; 46, when the additional airfoil 10 is in the retracted state (FIGS. 5*d*, 6*b* and 8*e*) covers the slot area 9 between the mainplane 20 and the additional airfoil 10 on the lower face at least partially with its slat part 29; 39; 49 and, when the additional airfoil 10 is extended (FIGS. 4*a*, 4*b*, 5*a*, 5*b*, 5*c*, 6*b*, 7*b* and 8*a*) the slat part 29 of the slot-varying apparatus 26; 36; 46 rests on the curved transition, which is located on the lower face of the additional slat 10, from the nose area 11 to the rear-face area 12. In this embodiment of the invention, the slot-varying apparatus 26; 36; 46 is therefore mounted such that it can rotate about the span direction with respect to the additional airfoil 10, that is to say at its front end in the profile chord direction or its side facing the flow S. The curved part 28; 38; 48 which forms the curved transition from the nose area 11 to the rear-face area 12 of the additional airfoil 10, may, for example have a tubular section of a tube which extends in the span direction, as shown in FIGS. 4, 5, 7 and 8, or may have the cross section of a tubular segment of a tubular segment which extends in the span direction, as shown in FIG. 6.

According to one embodiment of the invention, the slot-varying apparatus 16; 26; 36; 46 may be designed and coupled to the additional slat 10 such that it can be moved by aerodynamic forces acting between the mainplane 20 and the additional airfoil 10. The movement states are in this case located between the retracted state, in which the slot-varying apparatus forms a part of the aerodynamic profile of the additional airfoil 10 with the curved transition from the nose area 11 to the rear-face area 12 to the additional airfoil 30 when the additional airfoil 10 is extended, and the extended state, in which the slot-varying apparatus at least partially covers the remaining slot area 9 between the mainplane 20 and the additional airfoil 10 on the lower face when the additional airfoil 10 is in the retracted state (FIGS. 3*a* and 3*b*).

In the exemplary embodiment shown in FIGS. 2, 4, 5 and 8 the slot-varying apparatus 16; 26; 36; 46 is coupled to a drive device 5; 17; 27; 37; 47 which can move the slot-varying apparatus between the retracted state and the extended state, with this slot-varying apparatus forming a part of the aerodynamic profile of the additional airfoil 10 with the curved transition from the nose area 11 to the rear-face area 12 of the additional airfoil 10 when the additional airfoil 10 is extended, or covering the profile or resting on it, and in its extended state, it can cover the slot area 9 between the mainplane 20 and the additional airfoil 10 on the lower face when the additional airfoil 10 is in the retracted state. The drive apparatus operates the slot-bearing apparatus and therefore controls the movement state of the slot-varying apparatus.

The position of the drive apparatus may be provided in various ways. In the embodiments shown in FIGS. 2, 4*a* and 8, the drive device 17; 27; 47 is located outside the slot-varying apparatus. In alternative embodiments (FIGS. 4*b* and 5), the drive device 37 may be located within the slot-varying apparatus. In this case the drive apparatus may, in particular be arranged within the rotating part and thus in the area of the curved transition from the nose area 11 to the rear-face area 12 of the additional airfoil 10.

According to a further exemplary embodiment (FIG. 8) the operating state of the drive device 47 and therefore the movement state of the slot-varying apparatus 46 are coupled to the state of the additional airfoil, that is to say to the position of the additional airfoil 10, while it is being extended and retracted. The coupling may be provided, for example, via a sensor 60 which is functionally connected to the drive apparatus, that is to say in particular electrically or mechanically connected and transmits appropriate signals to the drive apparatus for one or more movement states of the additional airfoil

10 relative to the mainplane 20. The sensor 60 may be a probe 60 which is arranged between the mainplane 20 and the additional airfoil 10 such that, while the slot 9 is closing, it is touched by the nose area 21 of the mainplane 20 and, as a result of this sends an appropriate signal to the drive apparatus in order to operate it. FIG. 8*a* shows the wing with the additional airfoil 10 completely extended, FIG. 8*b* shows it with the additional airfoil 10 partially extended, and FIG. 8*c* shows it with the additional airfoil 10 completely retracted.

The curvature of the rotating part 28; 38; 48 is provided such that it is advantageous with respect to the aerodynamic characteristics of the slat 10 and the integration of the drive 27; 37; 47 as illustrated by way of example in FIGS. 5*a*, 5*b* and 5*c*.

According to some of the embodiments of the invention and of the wing according to the invention, the invention therefore provides for the slot-varying apparatus 16; 26; 36; 46 to be deformable, at least in places, transversely with respect to its longitudinal direction L or the profile chord direction of the wing, and in the process, for example to be designed to be elastically flexible. This ensures reliable extension and retraction of the additional airfoil even in the event of a malfunction of the sealing element. This is shown by way of example in FIG. 7*a* for the exemplary embodiment from FIGS. 4 and 5.

According to a further exemplary embodiment, the slot-varying apparatus may be accommodated at least partially in a depression or recess in the additional airfoil 10, as illustrated as the example in FIG. 7*b*. The cutout or depression extends in a cross section which results from a viewing direction transversely with respect to the flow direction S. In this case, a sealed cutout 50 can be provided in the additional airfoil 10 with the sealing element 26 being arranged such that it can rotate. Its rotating part 28 with a surface that is curved in places can be sealed by an additional seal 30 against the nose area 21 of the additional airfoil 10, in order to prevent flow from entering the area between the rotating part and the interior or the facing surface of the additional airfoil 20. The slot-varying apparatus 16; 26; 36; 46 in this way provides a gradual transition from the nose area to the curved area.

Figure 9:
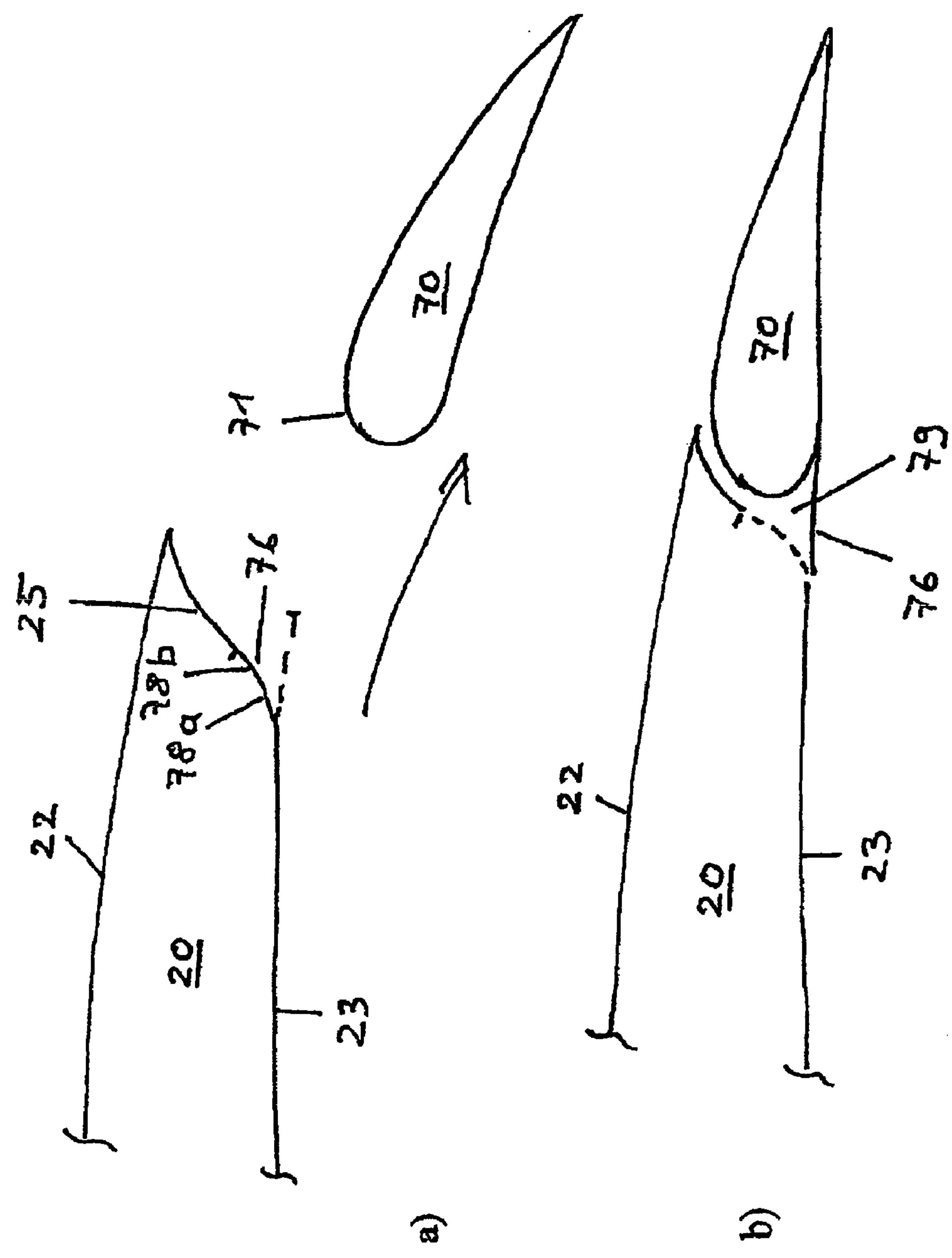
Figure 10:
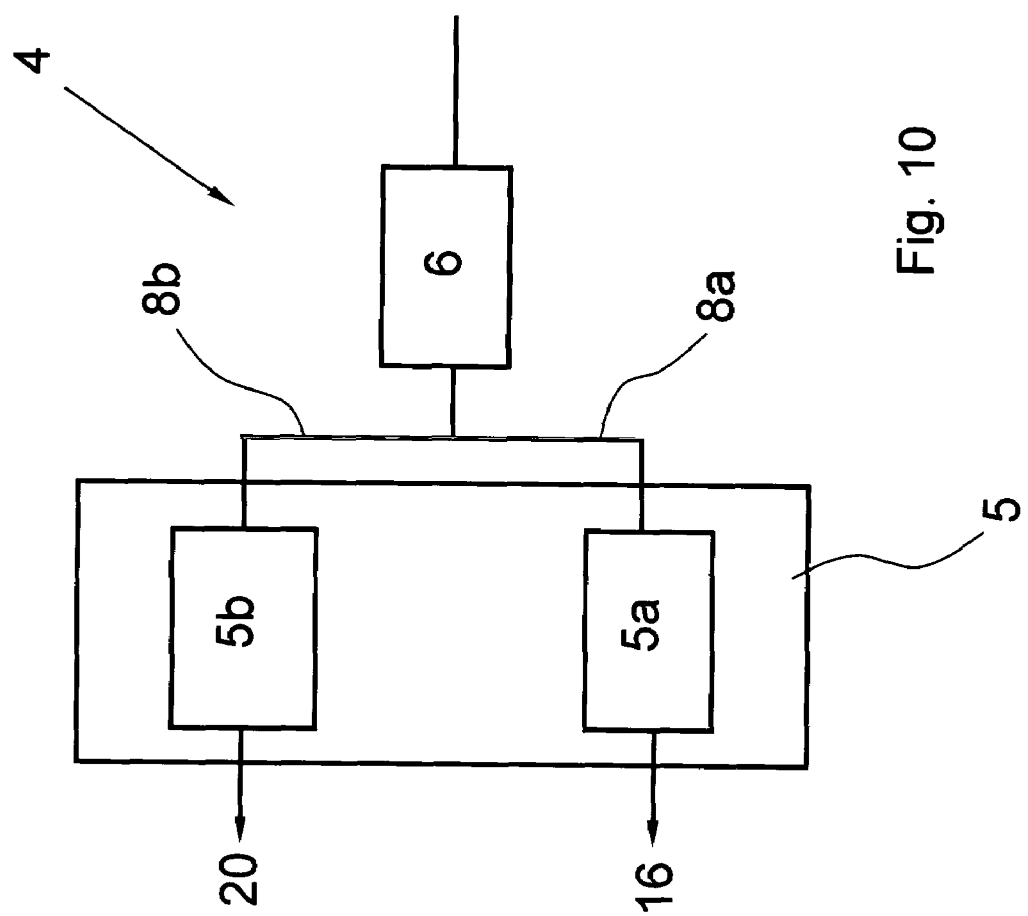
FIG. 10 shows a schematic illustration of an operating apparatus according to the invention.

Alternatively or additionally, the slot-varying apparatus according to the invention can also be arranged adjacent to the trailing edge of the mainplane 20, that is to say at the opposite edge to the correct flow S. In this case, the aforementioned functions and features can also be provided by the slot-varying apparatus described above. FIG. 9 shows a schematic cross-sectional view of a wing of an aircraft with a mainplane 20 and an additional airfoil 70 which is articulated on the mainplane, according to a further exemplary embodiment of the invention. The wing is formed from a mainplane 20 which has an upper face 22, a lower face 23 and an aerodynamically shaped rear end, or, in general, a rear-face area 25 facing away from the flow, with respect to the correct flow direction S. An additional airfoil 70 in the form of a high-lift flap, for example, a Fowler flap which is well known in its own right from the prior art, is arranged on the rear face of the mainplane 20 and is coupled to the mainplane 20. This flap has an aerodynamically shaped nose facing the rear-face area 25 of the mainplane 20 or, more generally a nose area 71 and can be moved between a retracted state and an extended state, with a slot area or slot 79 being opened between the rear-face area 25 of the mainplane 20 and the nose area 71 of the additional airfoil 70.

A variable shape slot-varying apparatus or a sealing element 76 is arranged on the rear face of the mainplane 20 and, when the additional airfoil 70 is extended, forms part of the aerodynamic profile of the mainplane 20, and at least partially covers the slot area 79 between the mainplane 20 and the additional airfoil 70 on the lower face when the additional airfoil 70 is in the retracted state. The slot-varying apparatus or the sealing element 76 is arranged at the transition between the lower face 23 and the rear face or rear-face area 25 of the mainplane 20, and can be varied or moved between a retracted state, contact state or a curved state, in which the slot-varying apparatus 76 forms a part of the aerodynamic profile of the mainplane 20 with a curved transition from the lower face 23 to the rear-face area 25 of the mainplane 20 when the additional airfoil 70 is extended, and an extended state in which the slot-bearing apparatus 76 at least partially covers the slot area 79 between the lower faces 23, 23*a* of the mainplane 20 and of the additional airfoil 70 when the additional airfoil 70 is in the retracted state. The slot-influencing state may in particular be a slot-closing state, in which the slot-varying apparatus closes the slot 9.

The explanatory notes relating to the exemplary embodiments illustrated in FIGS. 1 to 8, also apply in the same sense here.

The front end 76*a* of the slot-varying apparatus 76, seen in the flow direction S or the profile chord direction, is fixed to the mainplane 20. In a similar manner to that in the case of the exemplary embodiments shown in FIGS. 1 to 3, the slot-varying apparatus 76 may be designed to be elastically flexible at least in places in the profile chord direction of the wing, and may have flexibly variable curvature.

Alternatively, the slot-varying apparatus may also be in the form of a rigid part which can rotate or can be retracted and extended. In a similar manner to that in the case of the exemplary embodiments in FIGS. 4 to 8, the slot-varying apparatus 76 may be mounted at its front end 76*a* with respect to the mainplane 20 such that it can rotate about the span direction, so that its rear end 76*b* may assume various positions, depending on the movement state of the slot-varying apparatus. In this case, in particular, it is possible to provide for the slot-varying apparatus to form a transition, which is designed to be curved, for example, when the additional airfoil 70 is extended, from the lower face 23 to the rear face area 23 of the mainplane 20 when the additional airfoil 70 is extended. In this case, in particular, it is possible to provide for the slot-varying apparatus to have a curved shape in this state. In addition, it is also possible to provide, when the additional airfoil 70 is in the retracted state, for the slot-varying apparatus in its extended state, to at least partially cover a slot area 79 between the mainplane 20 and the additional airfoil 70 at its rear end 76*b* seen in the incident-flow direction S or in the profile chord direction as indicated in FIG. 9.

The slot-varying apparatus 76 may be variable between the curved configuration and the extended configuration by means of aerodynamic forces acting between the mainplane 20 and the additional airfoil 70.

On the other hand, in a similar manner to that in the exemplary embodiments in FIGS. 2, 4, 5 and 7, the slot-varying apparatus 76 may be variable between the curved configuration and the extended configuration by means of a drive device 5 which is coupled to it.

Figure 5:
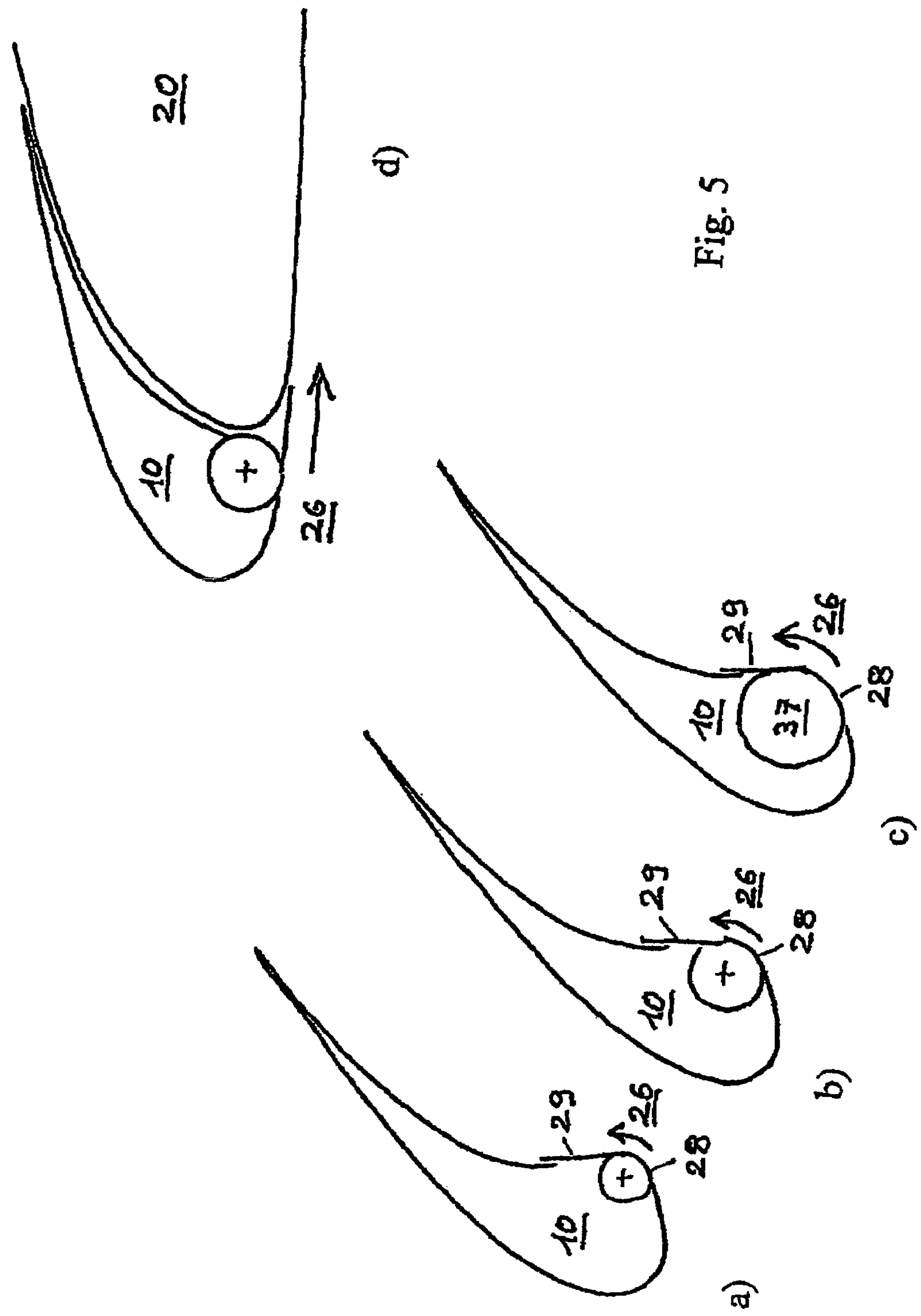
Figure 7:
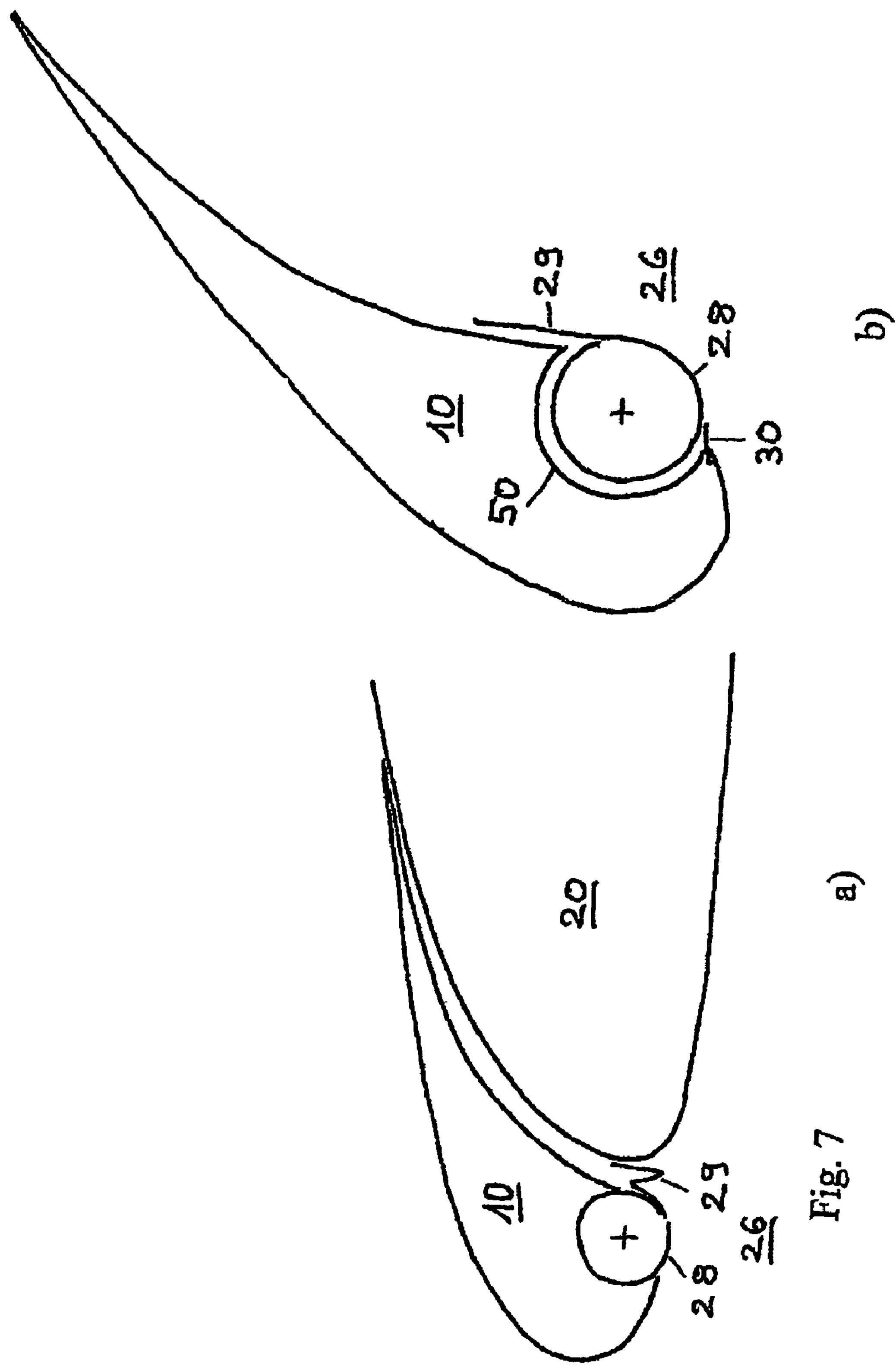
FIGS. 7*a* and 7*b* show schematic cross-sectional views of a wing of an aircraft with a mainplane and an additional airfoil which is articulated on the mainplane, according to the second exemplary embodiment of the invention, in order to explain damage tolerance in the event of a malfunction.
Figure 8:
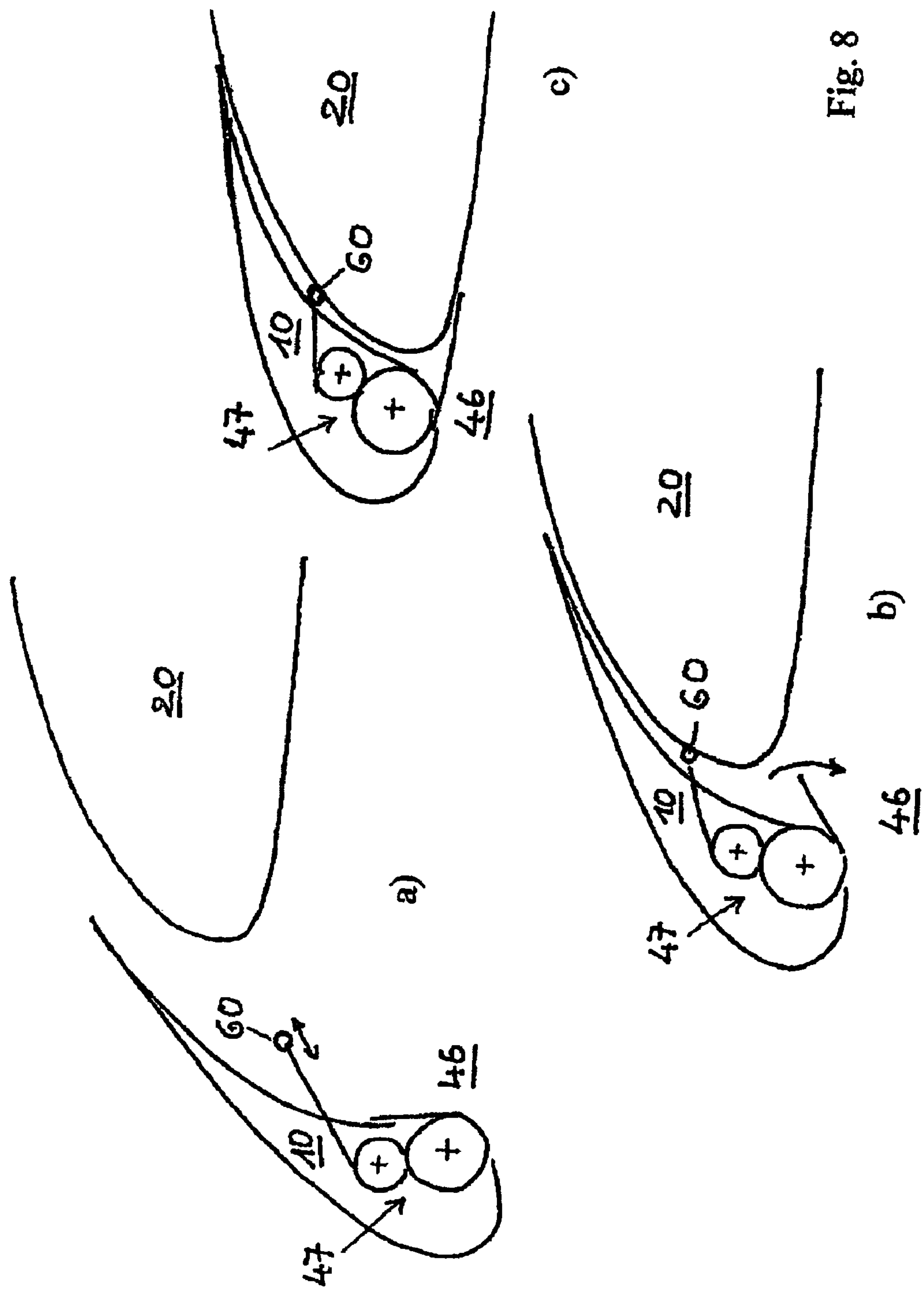
FIGS. 8*a* to 8*c* show schematic cross-sectional views of a wing of an aircraft with a mainplane and an additional airfoil in various positions, with this additional airfoil being articulated on the mainplane, according to a fourth exemplary embodiment of the invention, in which a drive device is kinematically coupled to the movement of the additional airfoil with respect to the mainplane for the purpose of positive movement of the sealing element during extension and retraction of the additional airfoil.

The drive device 5 may be arranged in the sealing element 76, for example, in the slat part 78*b* of the sealing element 76 which forms the curved transition from the lower face 23 to the rear-face area 25 of the mainplane 20 in a similar manner to that in the exemplary embodiments in FIGS. 4*b* and 5.

According to another embodiment, the drive apparatus can drive the slot-varying apparatus 76 on the basis of kinematic coupling of the extended and retracted state of the additional airfoil 70 to the movement state of the mainplane 20 in the sense of positive movement of the slot-varying apparatus 76 for example by the drive apparatus being kinematically coupled to a rail (flap track) by means of which the additional airfoil 70 is articulated on the mainplane 20.

In all of the exemplary embodiments described above, the rear-face area 12 of the additional airfoil 10 and the rear-face area 25 of the mainplane 20 are provided with a continuous contour without any sudden changes by virtue of the sealing element 16; 26; 36; 46; 76 which is designed to be curved when the additional airfoil 10 or 70 is in the extended state, thus considerably reducing the formation of noise-generating vortices in comparison to conventional rear-face contours without any concave taper (not without sudden changes), for example as known from DE 10 2004 056 537 A1 and normally referred to as a “slat hook”.

The drive apparatus for the slot-varying apparatus 16; 26; 36; 46 may be structurally integrated in the slot-varying apparatus. In this case, the drive apparatus may be formed from one or more piezo-actuators which are fitted on one surface or on two surfaces which extend in the longitudinal direction L of the slot-varying apparatus and are opposite one another. In this case, the slot-varying apparatus is designed to be flexible such that appropriately fitted piezo-actuators which are designed for the actuating modes of contraction and elongation can vary the shape and in particular the camber of the slot-varying apparatus in its longitudinal direction L. The piezo-actuators may, for example, be in the form of piezo-ceramic films, thin plates, wafers or fibers, including piezo-ceramic fibers with an interdigital electrode. A plurality of piezo-actuators in the form of plates may also be arranged in a plurality of discrete layers stacked one above the other and may be prefabricated to form a flat actuator step, in the form of plates (as a multilayer structure or in a bimorphous form). The piezo-actuators which are arranged in layers one above the other may also be in the form of quickpacks which are based on the piezo-electric d31 effect, or stack actuators which are based on the piezo-electric d33 effect.

In this case, the at least one piezo-actuator can be actively driven via a control device 6, or the piezo-actuators may be in the form of a passive circuit with the shape change of the slot-varying apparatus being produced on the basis of a movement, that is to say amplifying and/or continuing an initial movement. The passive circuit may be formed without a control device 6 or with it, for example as a safety function. In this case, the piezo-actuators and the circuit coupled to them are designed such that they send drive signals to at least some of the piezo actuators during their expansion on the basis of an initial movement in a retraction or extension direction of the slot-varying apparatus, in order to operate them in the sense of continuing in the initially detected movement of the slot-varying apparatus. The piezo-actuators may also have an actuating-movement enhancement element, for example, an appropriate rod which appropriately transforms the deflections of the piezo-actuators.

Furthermore, in the described embodiments, the drive apparatus (actuation device) may be part of an operating apparatus 4 (operating device) which has a control device 6 for driving the drive apparatus 5. In this case, the drive apparatus 5 receives a command signal in the control device 6, the magnitude of which signal corresponds to a movement state of the slot-varying apparatus.

In this embodiment, the operating device 4 includes a control device 6 and actuation devices 5*a*, 5*b*. The operating device 4 is functionally integrated with an aircraft system which are functional modules, for example realized by a software module, by hardware implemented functions (like ASICs) or by a computer module comprising these functions as software modules implemented therein. The operating device 4 with the control device 6 can be structurally integrated in the wing or in the fuselage as part of an aircraft electronic system.

The control device 6 comprises an actuation command function which is functionally connected and preferably in communication with the first actuation device 5*a* for generating a signal for actuation of the auxiliary flap 10, 70 and with the second actuation device 5*b* for generating a signal for actuation of the slot opening and closing device 16; 26; 36; 46 (slot varying apparatus). The first actuation device 5*a* and the second actuation device 5*b* can be integrated in one actuation device 5. Accordingly, the control device 6 is connected by a first command line 8*a* to the first actuation device 5*a* for driving or moving the auxiliary flap 10, 70 and with a second command line 8*b* to the second actuation device 5*b* for driving the slot opening and closing device 16; 26; 36; 46.

Depending on the function implemented in the actuation devices 5, 5*a*, 5*b*, the first command line 8*a* and the second command line 8*b* can be a bus line for transmitting digital command signals or can be an analogue signal line.

Based on the commands of the control device the actuation devices 5, 5*a*, 5*b* actuate the flap 10, 70 and the slot opening and closing device 16; 26; 36; 46, respectively, wherein the actuation devices can be powered electrically or hydraulically, if appropriate.

The aircraft can comprise one flap 10, 70 or several flaps 10, 70 and one or several slot opening and closing devices 16; 26; 36; 46 on each wing. The control device 6 and the first and second actuation device can be related to the one flap 10, 70 or to several flaps on both wings so that the flaps and the slot opening and closing devices 16; 26; 36; 46 on both wings are controlled by the first and second actuation device, respectively. Further, the operating device 4 can be configured such that the first and second actuation device are functionally coupled

- with one flap and a slot opening and closing device or a group of flaps and slot opening and closing devices on one wing or
- with one flap and a slot opening and closing device or a group of flaps and slot opening and closing devices which are provided symmetrically on both wings.

In the last case, several first and second actuation devices can be provided for actuating several flaps and slot opening and closing devices on both wings or several groups of flaps and a slot opening and closing device on both wings.

In the following, the actuation of only one flap with a slot opening and closing device 16; 26; 36; 46 is described as example. For the examples mentioned above, the embodiments are to be applied in an analogous manner.

The signals for actuation of the first and second actuation device can be generated, measured or calculated by an actuation command function of the control device upon operational data received by the actuation command function from another aircraft system device or operational data generated by the actuation command function itself. These operational data can for example be data describing or defining a flight state or an operational system mode like landing, approach or start. Particularly, these operational data or part of these operational data are generated, measured or calculated by the control device or by an another aircraft system and transmitted to the control device 6 from another system device functionally and/or located externally with regard to the operating device 4, like another aircraft system device, the autopilot or a manual input device for example a man-machine interface (MMI), a pilot's control device, the primary flight system, the secondary flight system and the navigation system.

In one embodiment of the operating device 5, operational data are transmitted to the actuation command function of the control device 6. The command function, based on these input data, calculates positions of the flap 10, 70 and of the slot opening and closing device 16; 26; 36; 46 and sends these to the first actuation device 5*a* and to the second actuation device 5*b* which actuate the flap 10, 70 and slot opening and closing device 16; 26; 36; 46, respectively. Also, this command function can be integrated in another aircraft system device outside the operating system 4, so that the operating system receives the desired or nominal positions of the flap 10, 70 and of the slot opening and closing device 16; 26; 36; 46 and transfers these positions with or without changes to the actuation devices 5*a*, 5*b* for actuating the flap and of the slot opening and closing device, respectively.

In a further embodiment, the control device comprises a command function which is designed to receive from an aircraft system device operational data, for example data describing or defining the flight state, a maneuver or an operational system mode like landing, approach or start or a phase thereof. The command function generates desired or nominal positions of the flap and/or of the slot opening and closing device. For this purpose, the command function can comprise a table in which pre-defined operational data are set in relation to desired or nominal positions of the flap and/or of the slot opening and closing device. With the operational data as input, the command function generates or identifies the desired or nominal positions of the flap and/or of the slot opening and closing device for the instant flight situation and/or system state and sends these position data to the first and second actuation device which actuate the flap and the slot opening and closing device, respectively.

Further, a function can be integrated in the command function which, based on flight data like altitude and/or speed and/or based on aircraft system data like safety-related data (for example failure degradation in the slat or flap system or another system), generates further nominal positions of the flap and/or of the slot opening and closing device for the instant flight situation which are transmitted to the first and second actuation device which actuate the flap and the slot opening and closing device, respectively.

For example the command function can be designed such that, during an operational system mode, for example start or landing, when the aircraft reaches a pre-defined flight state, like a pre-defined position and/or speed and/or altitude, the command function generates a command to the flap and/or the slot opening and closing device if the actual flight state value reaches or exceeds a pre-defined value which is determined by a comparison function. This function can be implemented in order to comply with noise and/or safety requirements and particularly in order to increase safety in critical flight phases.

Particularly, the slot opening and closing device can be commanded dependent on the position of the flap 10, 70 to extend the slot opening and closing device 16; 26; 36; 46 when the flap 10 is in its retracted position (FIG. 1*b*).

Further, a function can be provided in the actuation command function which stops the actuation of the flap and/or the slot opening and closing device, if a corresponding value is received by the operating device by another aircraft system device, for example for safety reasons.

The command function can be designed such that it generates the command signals in discrete steps or continuously according to the situations described above.

The first and optionally the second actuation device can generally be coupled to at least one position sensor for measuring the position of the flap and optionally one position sensor of the slot opening and closing device. The position sensor measures the actual position of the flap and/or the slot opening and closing device, respectively, and sends the actual position as feedback to the first and second actuation device. For failure detection a comparison of the nominal or desired value and the actual value is made in the corresponding actuation device 5*a*, 5*b*, or in the control device or in another module of the operating device 5 or in another aircraft system device. Based on the result of this comparison, the control device can receive or generate a fail safe command, for example not to actuate the flap and/or the slot opening and closing device.

The control device can be located close to the actuation devices 5*a*, 5*b*. In this case the control device or a part thereof, like the actuation command function, can be functionally connected to actuation devices 5*a*, 5*b* for transmitting the first and second, respectively, actuation command signals ("smart actuation device"). In this case, preferably a digital bus line connects the actuation devices with a control function of the control device which generates a desired value or nominal position value of the flap and the slot opening and closing device, respectively.

The command function can be configured such that it generates command signals by which the slot 9 is opened at a speed which is higher than the speed at which the flap 2 is itself extended.

The slot 9 can be opened by rotating or tilting the slot opening and closing device 16; 26; 36; 46 about an axis which runs in the wingspan direction, for example, as is illustrated in FIGS. 4 to 8, or by changing the shape of the slot opening and closing device 16; 26; 36; 46, for example as shown in FIG. 1 or by extending or retracting a slot opening and closing device 16; 26; 36; 46 through an opening in the flap 10, 70.

The slot 3 can be opened by an actuation device 5 which can be operated independently of or dependent on the position of the flap 2.

The actuation device 5 may be operated by a motor or motors.

By way of example, the actuation device 5 may be operated by spring force or by elastic deformation of components contained in it. The slot 3 can also be opened by aerodynamic forces.

The opening of the slot 3 can be enabled in response to an externally supplied signal, for example by releasing a catch or some other lock, and the slot 3 can be closed by a motor or motors.

List of Reference Symbols

9 Slot area
10 Additional airfoil
11 Nose area
12 Rear-face area
16 Slot-varying apparatus or sealing element
16*a* Front end of 16
16*b* Rear end of 16
17 Drive device
18 Curved area
19 Extended part
20 Mainplane
21 Nose area
22 Upper face
23 Lower face
23*a* Lower face of 10
25 Rear-face area
26 Slot-varying apparatus or sealing element
27 Drive device
28 Curved area
29 Extended part
30 Additional seal
36 Slot-varying apparatus or sealing element
37 Drive device
38 Curved area
39 Extended part
46 Slot-varying apparatus or sealing element
47 Drive device
48 Curved area
49 Extended part
50 Cutout
60 Probe
70 Additional airfoil
71 Nose area
76 Slot-varying apparatus or sealing element
76*a* Front end of 76
76*b* Rear end of 76
78*a* Curved part
78*b* Extended part
79 Slot area
S Flow direction
L Longitudinal direction

The invention claimed is:

1. A wing for an aircraft, having:

a mainplane having an upper face, a lower face, and a nose area facing a flow, an additional airfoil, articulated on the mainplane, having a nose area facing the flow and a rear-face area facing the nose area of the mainplane, and being movable between a retracted state and an extended state with a slot between the nose area of the mainplane and the rear-face area of the additional airfoil being varied, and a slot-varying apparatus arranged on a lower face of the additional airfoil, running along a contour of the additional airfoil when the additional airfoil is in the extended state, and at least partially covering a slot area between the mainplane and the lower face of the additional airfoil when the additional airfoil is in the retracted state, wherein the slot-varying apparatus is arranged at a transition between the nose area and the rear-face area of the additional airfoil and can be varied between a curved configuration, the slot-varying apparatus, when the additional airfoil is in the extended state, forming a curved part of an aerodynamic profile of the additional airfoil in the curved configuration, the transition from the nose area to the rear-face area of the additional airfoil being curved at the curved part, and an extended configuration, the slot-varying apparatus, when the additional airfoil is in the retracted state, at least partially covering the slot area in the extended configuration, wherein the slot-varying apparatus is designed to be elastically flexible at least in places in a profile chord direction of the wing, or has flexibly variable curvature, wherein the slot-varying apparatus can be varied between the curved configuration and the extended configuration via a drive device coupled to the slot-varying apparatus; and wherein the drive device is arranged in the slot-varying apparatus.

2. The wing as claimed in claim 1, wherein the slot-varying apparatus can be varied between the curved configuration and the extended configuration by aerodynamic forces acting between the mainplane and the additional airfoil.

3. The wing as claimed in claim 1, wherein the drive device is arranged in the curved part of the slot-varying apparatus.

4. The wing as claimed in claim 1, wherein the drive device is kinematically coupled to movement of the additional airfoil with respect to the mainplane in a sense of positive movement of the slot-varying apparatus during extension and retraction of the additional airfoil.

5. The wing as claimed in claim 4, wherein the drive device is kinematically coupled to a rail, the additional airfoil being articulated on the mainplane via the rail.

6. The wing as claimed in claim 1, wherein an operating device is provided for operating the slot-varying apparatus, the operating device comprising a control device used to open the slot as a function of an angle of attack or speed, or as a function of a parameter equivalent to the angle of attack or the speed.

7. The wing as claimed in claim 1, wherein the additional airfoil is a flap, and wherein the flap is a wing leading-edge slat.

8. The wing as claimed in claim 1, wherein the wing comprises:

an operating device with a control device, a first actuation device, and a second actuation device, wherein the control device is connected by a first command line to the first actuation device for driving a flap and with a second command line to the second actuation device for driving the slot-varying apparatus, and wherein the control device comprises a function for generating a signal for actuation of the first actuation device and for generating a signal for actuation of the second actuation device.

9. A wing for an aircraft, comprising:

a mainplane having an upper face, a lower face and a rear-face area, the rear-face area being aerodynamically shaped, an additional airfoil arranged on the rear-face area of the mainplane, articulated on the mainplane, having a nose area facing the rear-face area of the mainplane, the nose area being aerodynamically shaped, and being movable between a retracted and extended state, with movement to the extended state opening a slot between the rear-face area of the mainplane and the nose area of the additional airfoil, and a slot-varying apparatus arranged on the rear-face area of the mainplane, forming, when the additional airfoil is in the extended state, a part of an aerodynamic profile of the mainplane, and at least partially covering, when the additional airfoil is in the retracted state, a slot area between the mainplane and a lower face of the additional airfoil, wherein the slot-varying apparatus is arranged at a transition between the lower face and the rear-face area of the mainplane and can be varied between a curved configuration, the slot-varying apparatus forming a part of the aerodynamic profile of the mainplane at the transition from the lower face of the mainplane to the rear-face area of the mainplane when the additional airfoil is in the extended state and when the slot-varying apparatus is in the curved configuration, the transition being curved, and an extended configuration, the slot-varying apparatus at least partially covering the slot area when the additional airfoil is in the retracted state and when the slot-varying apparatus is in the extended configuration, wherein the slot-varying apparatus is designed to be elastically flexible at least in places in a profile chord direction of the wing, or has flexibly variable curvature, wherein the slot-varying apparatus can be varied between the curved configuration and the extended configuration via a drive device coupled to the slot-varying apparatus, and wherein the drive device is arranged in the slot-varying apparatus.

10. The wing as claimed in claim 9, wherein the slot-varying apparatus can be varied between the curved configuration and the extended configuration by aerodynamic forces acting between the mainplane and the additional airfoil.

11. The wing as claimed in claim 9, wherein the drive device is arranged in the curved part of the slot-varying apparatus.

12. The wing as claimed in claim 9, wherein the drive device is kinematically coupled to movement of the additional airfoil with respect to the mainplane in a sense of positive movement of the slot-varying apparatus during extension and retraction of the additional airfoil.

13. The wing as claimed in claim 12, wherein the drive device is kinematically coupled to a rail, the additional airfoil being articulated on the mainplane via the rail.

14. The wing as claimed in claim 9, wherein an operating device is provided for operating the slot-varying apparatus comprising a control device used to open the slot as a function of an angle of attack or speed, or as a function of a parameter equivalent to the angle of attack or the speed.

15. The wing as claimed in claim 9, wherein the additional airfoil is a high-lift flap, and wherein the high-lift flap is a wing trailing-edge flap.

16. The wing as claimed in claim 9, wherein the wing comprises:

an operating device with a control device, a first actuation device, and a second actuation device, wherein the control device is connected by a first command line to the first actuation device for driving a flap and with a second command line to the second actuation device for driving the slot-varying apparatus, and wherein the control device comprises a function for generating a signal for actuation of the first actuation device and for generating a signal for actuation of the second actuation device.

* * * * *